US009889924B2

(12) United States Patent
Harrison et al.

(10) Patent No.: US 9,889,924 B2
(45) Date of Patent: Feb. 13, 2018

(54) MULTI-DIRECTIONAL CONTROL USING UPPER SURFACE BLOWING SYSTEMS

(71) Applicant: The Boeing Company, Chicago, IL (US)

(72) Inventors: Neal A. Harrison, Lake Forest, CA (US); David C. Hyde, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 14/834,113

(22) Filed: Aug. 24, 2015

(65) Prior Publication Data
US 2017/0060140 A1     Mar. 2, 2017

(51) Int. Cl.
*B64C 9/38*        (2006.01)
*B64C 21/04*       (2006.01)

(52) U.S. Cl.
CPC ........... *B64C 9/38* (2013.01); *B64C 21/04* (2013.01)

(58) Field of Classification Search
CPC .................................. B64C 9/38; B64C 21/04
See application file for complete search history.

(56) References Cited

U.S. PATENT DOCUMENTS

| | | | | |
|---|---|---|---|---|
| 3,131,873 A * | 5/1964 | Sanders | ............... | B64C 29/0025 244/12.3 |
| 3,971,534 A * | 7/1976 | Grotz | ............... | B64C 9/20 239/265.33 |
| 3,972,490 A * | 8/1976 | Zimmermann | ......... | F02C 3/073 244/12.3 |
| 3,986,687 A * | 10/1976 | Beavers | ............... | B64D 33/04 239/265.41 |
| 4,358,074 A * | 11/1982 | Schoen | ............... | B64C 29/0025 244/12.4 |
| 4,474,345 A * | 10/1984 | Musgrove | ........... | B64C 29/0066 244/12.5 |
| 4,784,355 A * | 11/1988 | Brine | ............... | B64C 9/20 244/213 |
| 6,112,141 A * | 8/2000 | Briffe | ............... | G01C 23/00 345/1.3 |
| 7,823,826 B1* | 11/2010 | Lewis | ............... | B64C 21/04 244/12.5 |
| 8,167,249 B1* | 5/2012 | Harrison | ............... | B64C 1/064 244/207 |
| 9,505,484 B1* | 11/2016 | Al-Sabah | ............... | B64C 3/38 |
| 2003/0154720 A1* | 8/2003 | Boehnlein | ............... | F02K 7/10 60/767 |
| 2005/0103929 A1* | 5/2005 | Chang | ............... | B64C 3/16 244/15 |

(Continued)

FOREIGN PATENT DOCUMENTS

WO     WO 2005062743 A2 *  7/2005     ............... B64C 3/16

*Primary Examiner* — Calvin Cheung
(74) *Attorney, Agent, or Firm* — Hanley, Flight & Zimmerman, LLC

(57) ABSTRACT

Multi-directional control using upper surface blowing systems is described herein. One disclosed example method includes a flow director of an aircraft, where the flow director is to cause an exhaust stream of an upper surface blowing system to attach to a fuselage of the aircraft, and a controller to control the flow director to affect one or more of a pitch, a yaw or a roll of the aircraft by varying a degree of the attachment of the exhaust stream to the fuselage.

16 Claims, 10 Drawing Sheets

(56) References Cited

U.S. PATENT DOCUMENTS

| | | | |
|---|---|---|---|
| 2007/0057113 A1* | 3/2007 | Parks | B64C 15/00 |
| | | | 244/12.5 |
| 2009/0127379 A1* | 5/2009 | Lugg | B64C 29/0066 |
| | | | 244/12.3 |
| 2009/0210103 A1* | 8/2009 | Cook | B64C 21/025 |
| | | | 701/3 |
| 2011/0031043 A1* | 2/2011 | Armani | F03D 9/00 |
| | | | 180/2.2 |
| 2012/0091266 A1* | 4/2012 | Whalen | B64C 5/06 |
| | | | 244/87 |
| 2016/0047288 A1* | 2/2016 | Arrowsmith | B01F 5/0473 |
| | | | 60/274 |
| 2016/0214710 A1* | 7/2016 | Brody | B64C 29/0033 |
| 2016/0368601 A1* | 12/2016 | Avery | B64C 29/0025 |

* cited by examiner

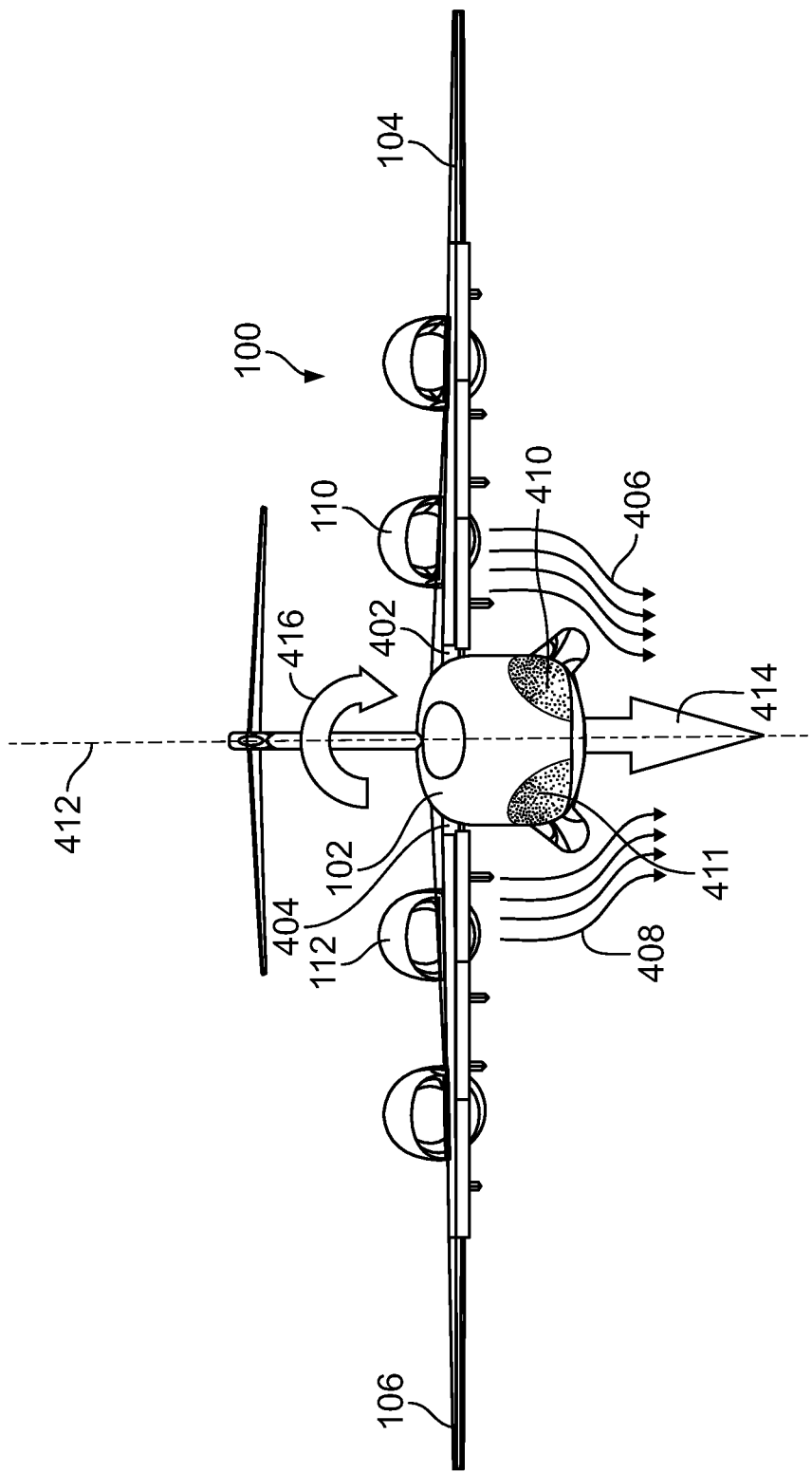

MULTI-DIRECTIONAL CONTROL USING UPPER SURFACE BLOWING SYSTEMS

RELATED APPLICATION

This patent includes subject matter related to U.S. application Ser. No. 12/410,820, which was filed on Mar. 25, 2009, granted as U.S. Pat. No. 8,167,249, and which is hereby incorporated by reference in its entirety.

FIELD OF THE DISCLOSURE

This patent relates generally to upper surface blowing systems and, more particularly, to multi-directional control using upper surface blowing systems.

BACKGROUND

Generally, a fluid body such as an aircraft wing includes flaps to increase a lift coefficient of the wing. In known upper surface blowing (USB) systems, blown flaps employ efflux (e.g., air and/or exhaust or an exhaust stream) of engines to provide lift for short take-off and landing (STOL) or extremely short take-off and landing (ESTOL) maneuvers. The engines used in these systems may be disposed above or beneath the wings. If the engines are disposed above the wings, the flaps are upper surface blown flaps and the efflux of the engines interacts with upper surfaces of the wings and the flaps to provide lift. For example, the efflux may follow a curvature of the upper surfaces of the wings and the flaps to provide lift.

Known systems used for STOL or ESTOL maneuvers may allow control and/or variation of lift, but may be limited (e.g., limited in terms of degrees of freedom) in directional control of an aircraft during such maneuvers. In particular, as these known systems generate the lift necessary for STOL or ESTOL maneuvers, typical control effectors such as elevator and rudders become less effective due to decreased dynamic pressure experienced by the control effectors. To counteract this reduced effectiveness, control surfaces of USB aircraft are often made to be relatively large, thereby requiring increased weight and/or decreased efficiency of these aircraft. These relatively large control surfaces may result in diminished performance during cruise, for example.

SUMMARY

An example apparatus includes a flow director of an aircraft, where the flow director is to cause an exhaust stream of an upper surface blowing system to attach to a fuselage of the aircraft, and a controller to control the flow director to affect one or more of a pitch, a yaw or a roll of the aircraft by varying a degree of the attachment of the exhaust stream to the fuselage.

An example method includes controlling an attachment of an exhaust fluid flow from an upper surface blowing system of an aircraft to a fuselage of the aircraft to change at least one flight characteristic of the aircraft.

An example tangible readable medium includes instructions stored thereon, which when executed, cause a controller to at least receive a flight input for an aircraft, and direct an amount of flow from an upper surface blowing system engine of the aircraft to attach to a fuselage of the aircraft to control one or more of a yaw, a pitch, or a roll of the aircraft.

Another example apparatus includes a first fluid source of an upper surface blowing system on a first fluid body of an aircraft, and a second fluid source of the upper surface blowing system on a second fluid body of the aircraft, where the first and second fluid sources are to provide fluid to respective sides of a fuselage of the aircraft. The example apparatus also includes a controller to vary a degree to which fluid from the first and second fluid sources attaches to the fuselage to control one or more of a yaw, a pitch, or a roll of the aircraft.

BRIEF DESCRIPTION OF THE DRAWINGS

FIG. 4 illustrates roll and pitch control, in accordance with the teachings of this disclosure.

Figure 1:
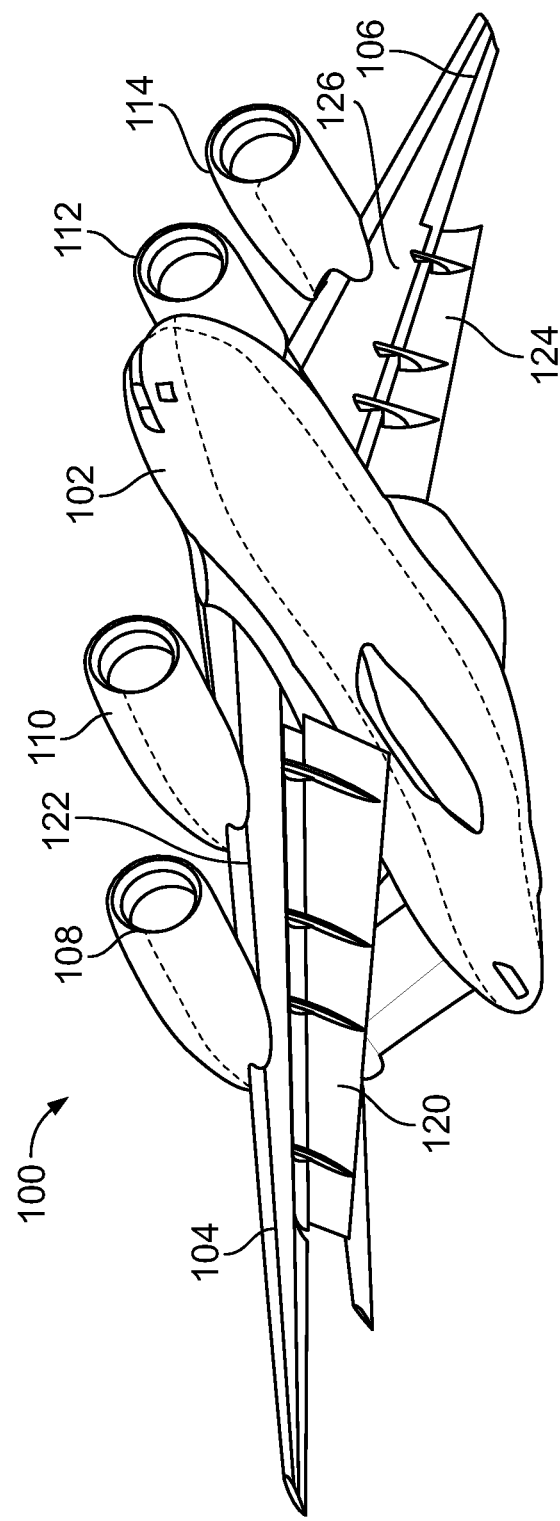
FIG. 1 is an example aircraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Multi-directional control using upper surface blowing systems is disclosed herein. Upper surface blowing (USB) systems are used in aircraft for short take-off and landing (STOL), and extreme short take-off and landing (ESTOL) maneuvers in which the aircraft may take-off from a runway or open space in a relatively short distance. The USB systems typically utilize a fluid source (e.g., a compressible or incompressible exhaust fluid source such as an engine) to provide a flow over a wing assembly and/or trailing edge of an aircraft to enable flow turning, which is an ability of a surface to influence fluid (e.g., air) flowing near and/or in contact with the surface to follow a curvature of a surface. Flow turning may result from the Coanda effect, which is a tendency of a flowing fluid (e.g., air) near and/or in contact with a surface to follow a profile or curvature of the surface such as a trailing edge of a flap of the wing assembly, for example. Flow turning, via the Coanda effect, may be controlled/adjusted to enable short aircraft take-off distances and low aircraft landing speeds. While the Coanda effect can be used for limited control of aircraft with upper surface blowing systems, the degree to which the aircraft may be controlled is limited during STOL or ESTOL maneuvers, for example, in known systems due to limited (e.g., relatively low) dynamic pressure, for example.

The examples disclosed herein allow improved multi-directional control of aircraft (e.g., flight characteristics of aircraft) in multiple degrees of freedom, even in scenarios with low dynamic pressure. In particular, the examples disclosed herein enable control of aircraft in multiple degrees of freedom by varying an attachment of efflux from one or more flow sources (e.g., compressible fluid sources, engine(s), etc.) of an upper surface blowing system to a fuselage of the aircraft during high-lift operations such as STOL and ESTOL, thereby allowing effective maneuvering of one or more of yaw, pitch or roll of the aircraft at relatively low dynamic pressures (e.g., when tail effectors are less effective). The examples disclosed herein enable reduction in size of conventional control surfaces and, thus, allow increased efficiency (e.g., fuel efficiency, aerodynamic efficiency, etc.) in multiple flight regimes by reducing both weight and drag, for example. Reduction of weight and drag may reduce aircraft costs as well as operating costs of aircraft. The reduction in control surfaces may also favorably impact vehicle longevity and/or survivability. The examples disclosed herein allow full use of USB capabilities by providing effective maneuvering capabilities at relatively low speeds and/or dynamic pressures. The examples disclosed herein allow use of small and/or low power effectors to cause or direct attachment of efflux to a fuselage. The examples disclosed herein may also be used to create plume/efflux attachment to a fuselage of an aircraft during cruise, thereby potentially improving survivability of the aircraft and/or detectability of the aircraft.

As used herein, the term "effectors" may apply to any device and/or mechanism used to divert and/or direct flow (e.g., flow from an engine source, etc.) and may also refer to internal components of an engine and/or engine assemblies, for example, that divert flow/efflux. While flight characteristics such as yaw, pitch and/or roll are described in the examples disclosed herein as distinct directions of motion, these directions of motion may be related and/or controlled in conjunction with one another. For example, controlling one of these directions of motions may affect (e.g., inherently affect) the others and, thus, these directions of motions may not be independent of one another.

FIG. 1 is an example aircraft 100 in which the examples disclosed herein may be implemented. In the illustrated example, the aircraft 100 includes a fuselage 102, a first wing assembly 104 and a second wing assembly 106. A first engine 108 and a second engine 110 are coupled to the example first wing assembly 104. A third engine 112 and a fourth engine 114 are coupled to the example second wing assembly 106. Other example aircraft include other numbers (e.g., 1, 2, 3, 5, etc.) of engines.

The first wing assembly 104 of the illustrated example includes a first flap 120 movably coupled to a wing 122. Likewise, the example second wing assembly 106 includes a second flap 124 movably coupled to a second wing 126. Although the example first flap 120 and the example second flap 124 are each shown as monolithic, each of the first flap 120 and/or the second flap 124 may comprise two or more flaps, which may be spaced apart spanwise along the respective wing assemblies 104, 106 and/or independently moveable (e.g., extendible, retractable, flexible, elastically flexible, etc.). In this example, the first flap 120 and the second flap 124 of FIG. 1 are in a deployed position. When the example first flap 120 and the example second flap 124 are in the deployed position, cambers (e.g., curvatures) of the first wing assembly 104 and the second wing assembly 106 are substantially maximized. In the illustrated example, the first wing assembly 104 and the second wing assembly 106 are mirror images but are otherwise substantially similar or the same. In other examples, the first wing assembly 104 is a different shape and/or size than the second wing assembly 106.

Figure 2:
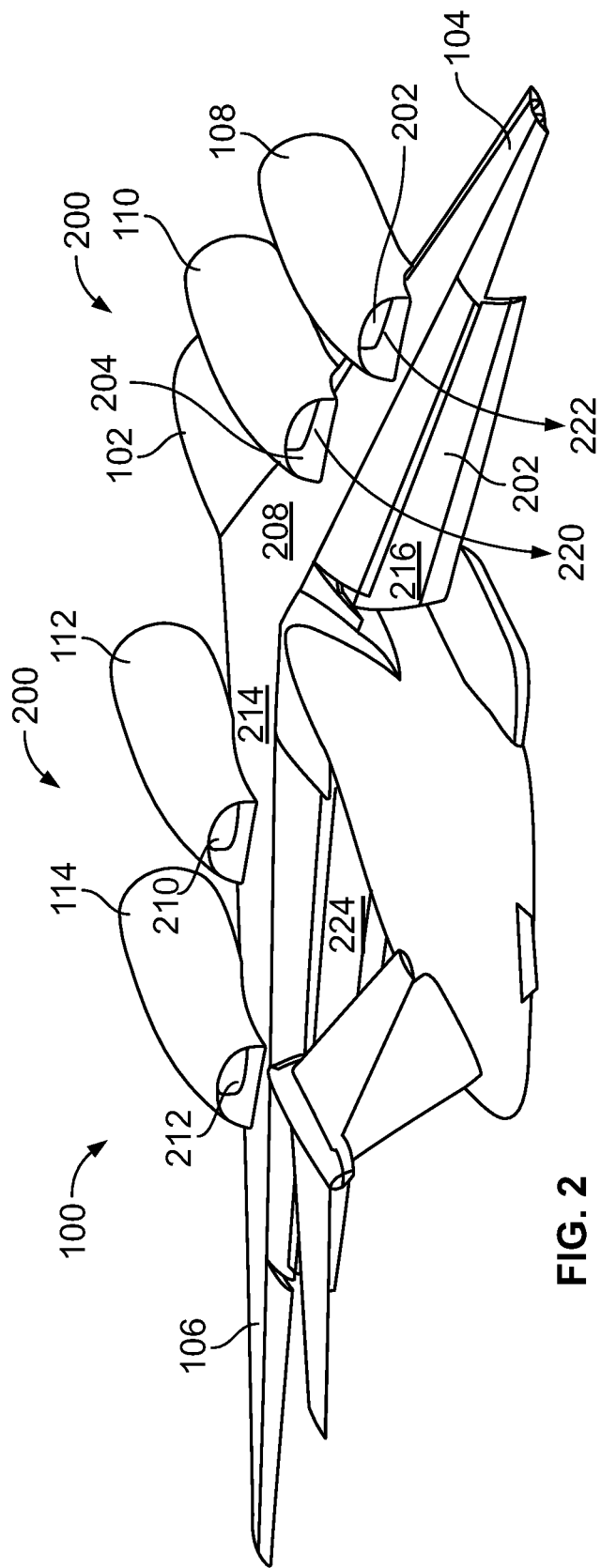
FIG. 2 is a view of an upper surface blowing system of the example aircraft of FIG. 1 that may be used to implement the examples disclosed herein.

FIG. 2 is a view of an example upper surface blowing system 200 of the example aircraft 100 of FIG. 1 that may be used to implement the examples disclosed herein. In the illustrated example of FIG. 2, a first nozzle 202 of the first engine 108 and a second nozzle 204 of the second engine 110 are disposed above the first wing assembly 104 in the orientation of FIG. 2. The first nozzle 202 and the second nozzle 204 direct efflux (e.g., air and/or exhaust) of the first engine 108 and the second engine 110, respectively, onto and/or along an upper surface 208 of the first wing assembly 104. Similarly, a third nozzle 210 and a fourth nozzle 212 direct efflux of the third engine 112 and the fourth engine 114, respectively, onto and/or along an upper surface 214 of the second wing assembly 106.

In operation, efflux (e.g., air, exhaust and/or exhaust fluid flow) exiting the second engine 110 flows along the upper surface 208 of the wing assembly 104. As the efflux flows along the upper surface 208, the efflux follows a curvature of the upper surface 208 and flows towards and along an upper surface 216 of the flap 120 and, thus, flows in a direction generally indicated by an arrow 220. Likewise, efflux from the first engine 108 flows in a direction generally indicated by an arrow 222. As a result of these flow paths, the efflux flows from the second engine 110 and the first engine 108 generate lift.

To generate lift, the efflux from the first engine 108 and the second engine 110 flows generally downward, the efflux flows along the upper surface and follows a curvature of the upper surface 216 and, thus, flows downward to generate lift via the aforementioned Coanda Effect. Similarly, nozzles of the third engine 112 and the fourth engine 114 provide an efflux to flow along the upper surface 214 and a respective upper flap surface 224 of the wing assembly 106 to generate lift. In accordance with the teachings of this disclosure, the efflux from the second engine 110 and/or the first engine 108, for example, may be directed towards the fuselage 102 of the aircraft 100 to control attachment of the efflux to the fuselage 102 to control the aircraft 100 in numerous degrees of freedom. In particular, the efflux and/or multiple effluxes (e.g., multiple effluxes controlled simultaneously) may be directed in varying degrees (e.g., independently) towards the fuselage 102 to affect one or more of a pitch, a roll, or a yaw of the aircraft 100.

Figure 3A:
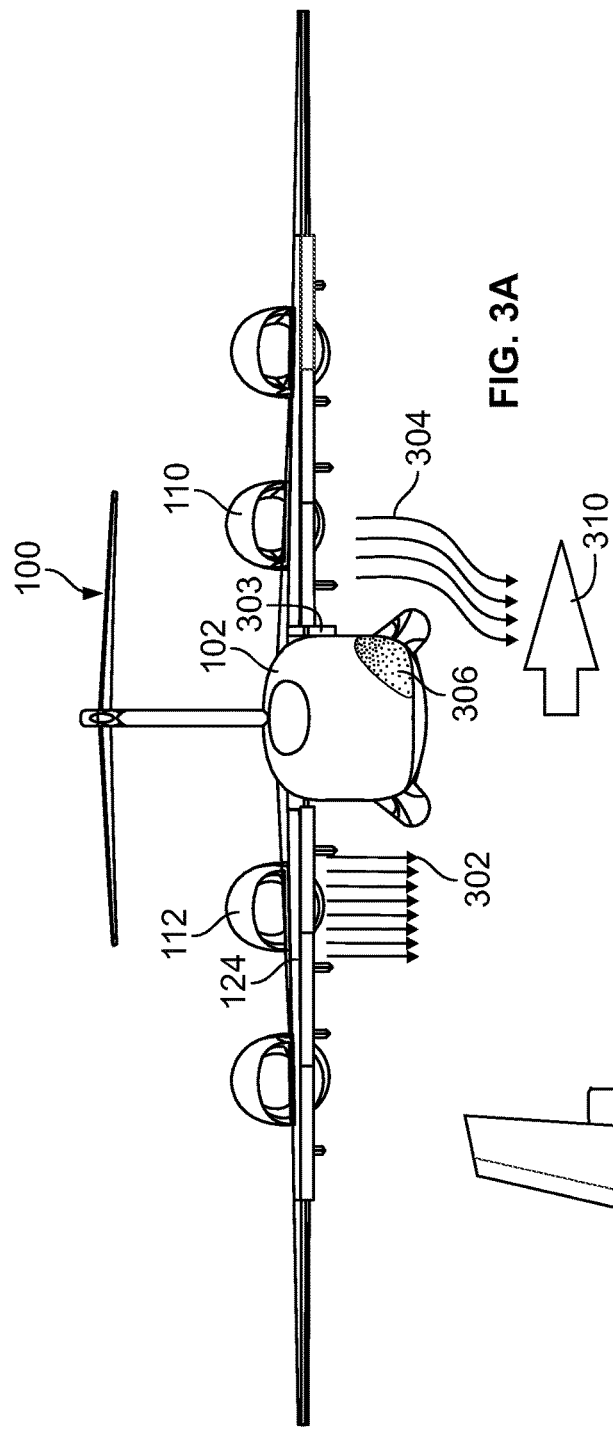
FIGS. 3A and 3B illustrate yaw control, in accordance with the teachings of this disclosure.
Figure 3B:
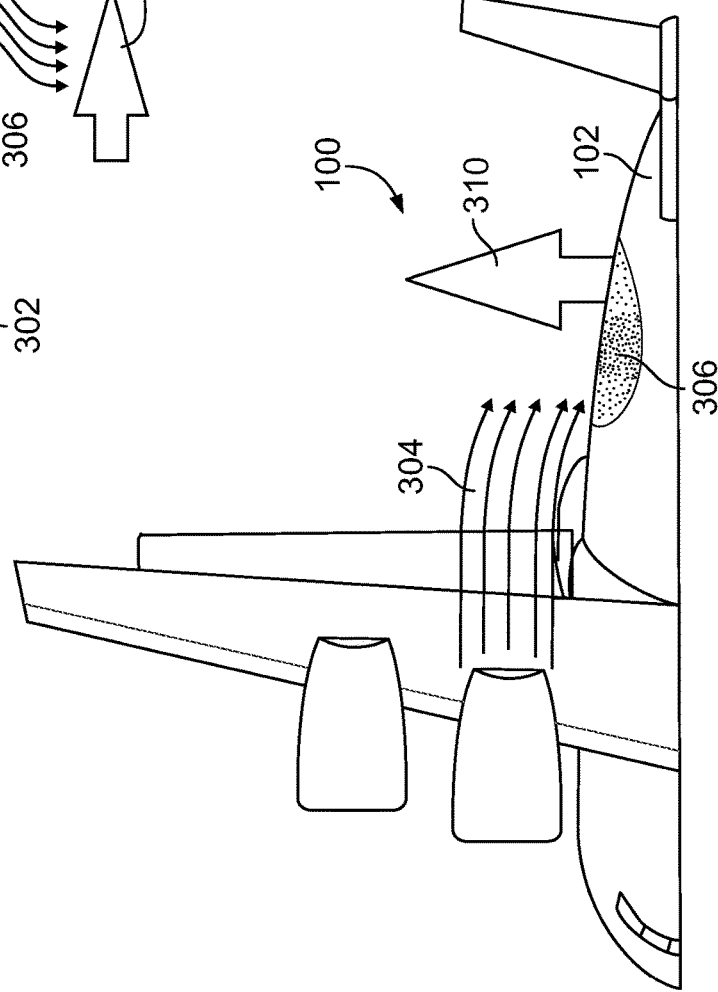

FIGS. 3A and 3B illustrate yaw control, in accordance with the teachings of this disclosure. FIG. 3A is a rear view of the aircraft 100 of FIG. 1. In the illustrated example of FIG. 3A, an efflux 302 from the third engine 112 flows over and follows a contour of the flap 124 and, thus, generates lift. In contrast to the efflux 302, an efflux (e.g., a plume) 304 from the second engine 110 is directed by an effector 303, which may be located on the wing assembly 104 or the fuselage 102, to flow (e.g., partially flow) towards the fuselage 102 causing a plume to adhere to the fuselage 102 on an inboard side of the fuselage 102, thereby defining a region 306 of localized relatively lower pressure. USB systems tend to have rapid attachment characteristics once a critical proximity is reached and, thus, the efflux 304 of the illustrated example can abruptly change direction towards the fuselage 102 based on flow/geometry characteristics. In particular, relatively little energy is needed by the effector 303 to direct the efflux 304 to attach to the fuselage 102 due to the dynamic properties of efflux flows. One advantage of this flow phenomena is that a small and/or relatively low power usage effector can be used to direct USB efflux flows to attach to a fuselage. Further, effectors with relatively quick movements can quickly change attachment characteristics of effluxes towards a fuselage, for example. In known USB systems, efflux flow is not directed to attach to a fuselage (i.e., such as the flow depicted with the efflux 302).

The asymmetry in flow attachment and/or resultant pressure differentials caused by the efflux 302 and the efflux 304 results in a net yaw force generally indicated by an arrow 310. In other words, a degree to which the efflux 302 and the efflux 304 are attached to the fuselage may be used to control yaw. In particular, flow directions (e.g., flow paths) of the efflux 302 and the efflux 304 (e.g., a degree to which the efflux 302 and the efflux 304 are directed to attach to the fuselage 102) and/or flow parameters (e.g., flow rates, flow stream dimensions and/or width, angle(s) of incident flow, etc.) of the efflux 302 and the efflux 304 may be varied relative to one another (e.g., a delta) to control/vary amounts of pressure along the fuselage 102 that result from pressure differentials at different locations of the fuselage 102 caused by the efflux 302 and the efflux 304 (e.g., pressure differentials resulting from differences in location and/or magnitude of attachment of the effluxes 302, 304). Attachment effects from the efflux 302 and associated directional control may be modulated by combinations of flow parameters, deflections of one or more of the flaps 120, 124 and/or thrust magnitude from the engines 110 114.

FIG. 3B is a top view of a portion the aircraft 100 of FIG. 1. As can be seen in the view of FIG. 3B, the efflux 304 attaches to the fuselage 102 in an additional inboard direction. Based on the FIGS. 3A and 3B, the efflux 304 of the illustrated example attaches to the fuselage 102 in multiple directions (e.g., a multi-dimensional flow that follow contours of the fuselage 102 in both a downward/towards the ground and a horizontally inboard direction towards a center of the fuselage 102) to define the aforementioned low pressure region 306, and results in a net yaw force generally indicated by the arrow 310. Controlling/varying an attachment of the efflux 304 to the fuselage 102 in multiple directions allows precise directional control of the aircraft 100 during STOL or ESTOL maneuvers.

FIG. 4 illustrates roll and pitch control, in accordance with the teachings of this disclosure. In the illustrated example of FIG. 4, effectors 402, 404, which are deployed in this example, are coupled to and/or integral with the wing assemblies 104, 106, respectively. In this example, the effectors 402, 404 are used to control/vary an attachment of effluxes 406, 408 from the second and third engines 110, 112, respectively, to the fuselage 102 to control the aircraft 100. The effluxes 406, 408 of the illustrated example define relatively low pressure zones 410, 411.

In operation, a symmetry of pressure differentials along a centerline 412 that result from the effluxes 406, 408 can cause a pitching moment (e.g., a nose up pitching moment) of the aircraft 100, as generally indicated by an arrow 414. The pitching moment may depend (e.g., nose up or nose down) on a location of the center of gravity in relation to the pressure differentials caused by the effluxes 406, 408 and/or a net sum of the pressure differentials acting on the fuselage 102. Conversely, asymmetry and/or a degree of asymmetry caused by pressure differentials resulting from attachment of the effluxes 406, 408 to the fuselage 102 may result in a rolling motion, as generally indicated by an arrow 416. In particular, the effluxes 406, 408, differences between the effluxes 406, 408 and/or pressure differentials caused by the effluxes 406, 408 may result in control of pitch, roll and/or yaw, all or some of which may be directly or indirectly related to one another (i.e., control of pitch, roll and/or yaw of the aircraft 100 may not be independent of one another). For example, control of one or more yaw, pitch or roll may have components of motion (e.g., vector components) that affect one another.

While the examples of FIGS. 3A-4 describe how differences in attachment of multiple effluxes from upper surface blowing systems may be used to control an aircraft during STOL or ESTOL maneuvers by controlling the degree to which efflux flows attach to a fuselage, numerous flow devices, flow direction mechanisms and/or flow control systems may be used to achieve such an end, and, thus, the examples disclosed herein are not exhaustive. Example devices to vary a degree of attachment of effluxes and/or to control pressure differences between different areas of a fuselage are described below in connection with FIGS. 5-10. Any combination of the devices of FIGS. 5-10 may be used in conjunction with one another. Further, the devices of FIGS. 5-10 may be used to generate flow attachment during flight, for example, for stability during cruise and/or detection improvement. While the examples of FIGS. 5-10 are shown in relationship to the second engine 110, they may be used in conjunction with any of the engines (e.g., the third engine 112, engine 112, engines that are not adjacent to the fuselage 102)

Figure 5:
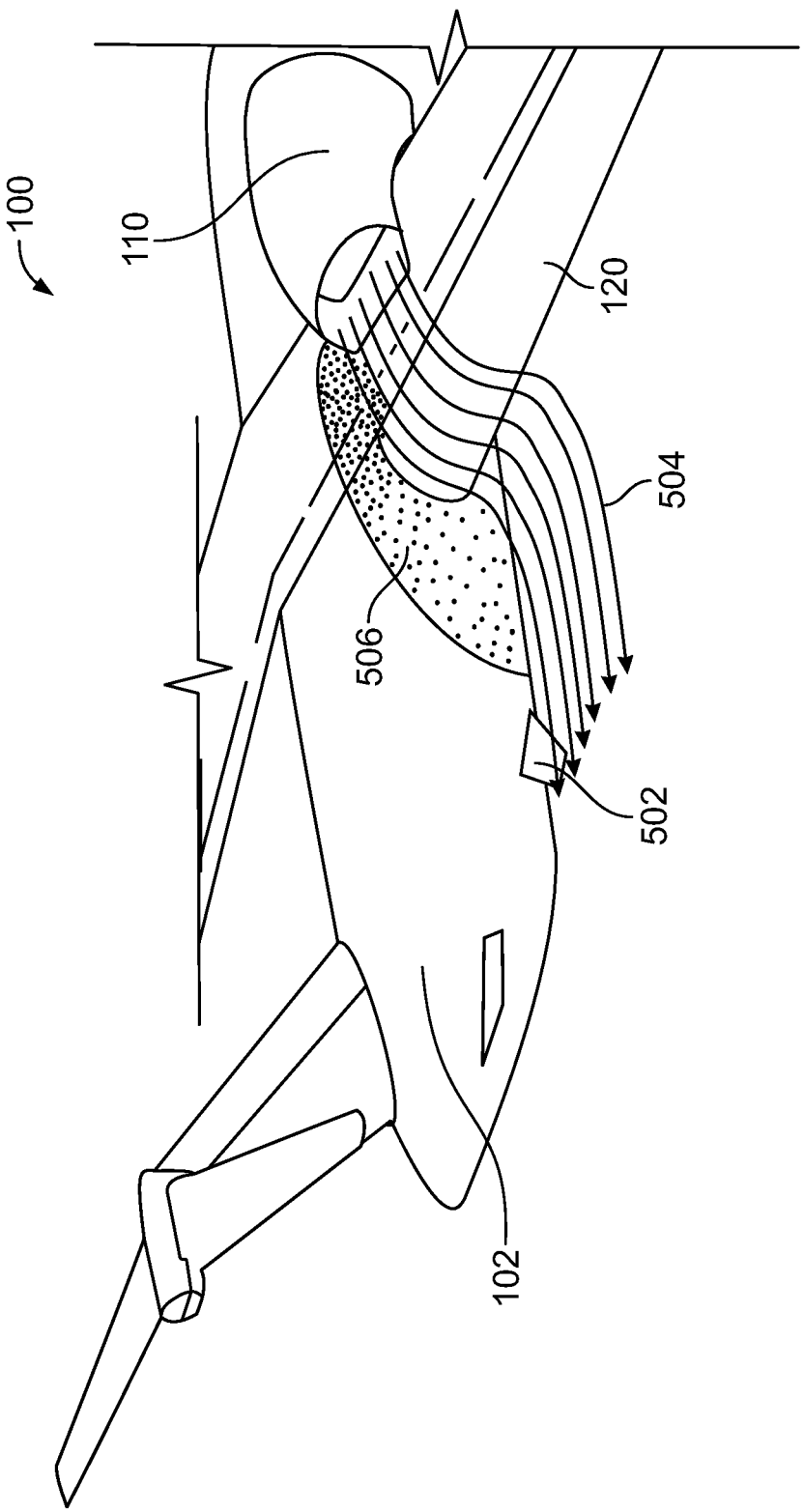
FIG. 5 illustrates an example vane that may be used with the examples disclosed herein.

FIG. 5 illustrates operation of an example vane 502 that may be used with the examples disclosed herein. In the illustrated example of FIG. 5, the vane 502 is disposed on the fuselage 102 and is to affect, control and/or vary a degree of flow attachment of an efflux 504 to the fuselage 102. In this attachment process, the vane 502 defines a relatively low pressure zone 506, which affects pressure differentials experienced by the fuselage 102 to control one or more of a yaw, pitch, or roll of the aircraft 100.

In some examples, the vane 502 may be deployable and/or oriented to alter an attachment of the efflux 504 from the second engine 110 to the fuselage 102. In particular, an automated flight control system such as an automated flight control system 1100 of FIG. 11, for example, may be used to vary an orientation and/or degree of deployment of the vane 502 to control/maneuver the aircraft 100. In some examples, control of the flap 120 in combination with controlling the vane 502 (e.g., extension and/or orientation of the vane 502, etc.) is used to maneuver the aircraft 100. In some examples, the vane 502 may alter its shape to vary the attachment of the efflux 504 and/or alter flight dynamics of the aircraft 100. In some examples, vanes on opposite sides of the aircraft 100 may be used to vary symmetry of attachment of efflux attachment to the fuselage 102. In some examples, multiple vanes are controlled (e.g., rotation, extension, etc.) independently of one another by an automated flight control system. In other examples, vortex generators may be used to energize the efflux 504 and/or increase attachment of the efflux 504 to the fuselage 102.

Figure 6:
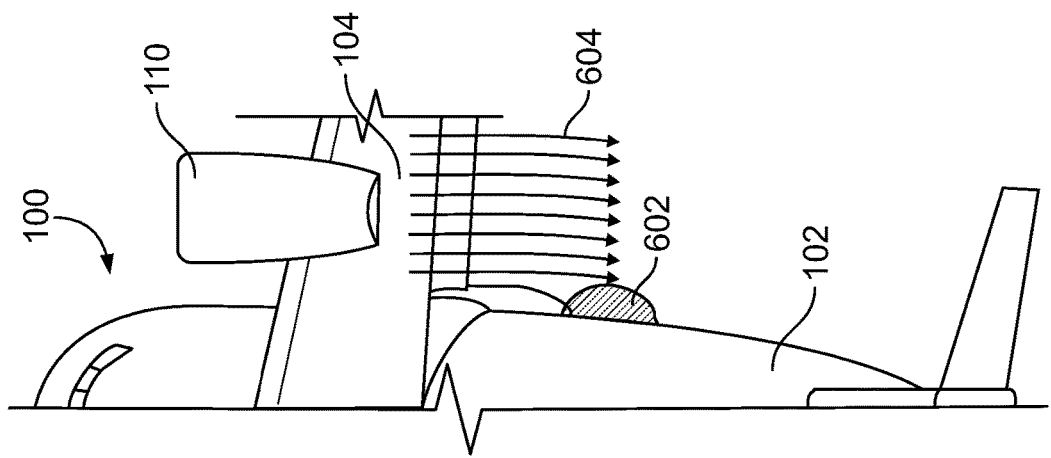
FIG. 6 illustrates an example fuselage protrusion, which may be deployable, to vary an attachment of flow to a fuselage of the example aircraft of FIG. 1.

FIG. 6 illustrates use of an example fuselage protrusion (e.g., a bump, a conformal, continuous moldline, etc.) 602, which may be deployable, to vary attachment of efflux flow 604 from the second engine 110 to the fuselage 102. The degree to which the example protrusion 602 extends from the fuselage 102 may be varied and/or controlled by a flight control system such as the automated flight control system 1100 of FIG. 11. In this example, the protrusion 602 is positioned relatively close to the second engine 110 and the wing assembly 104 to increase an attachment of the efflux 604 from the second engine 110. Additionally or alternatively, in some examples, the protrusion 602 is movable (e.g., repositionable) along the fuselage 102, for example.

Figure 7:
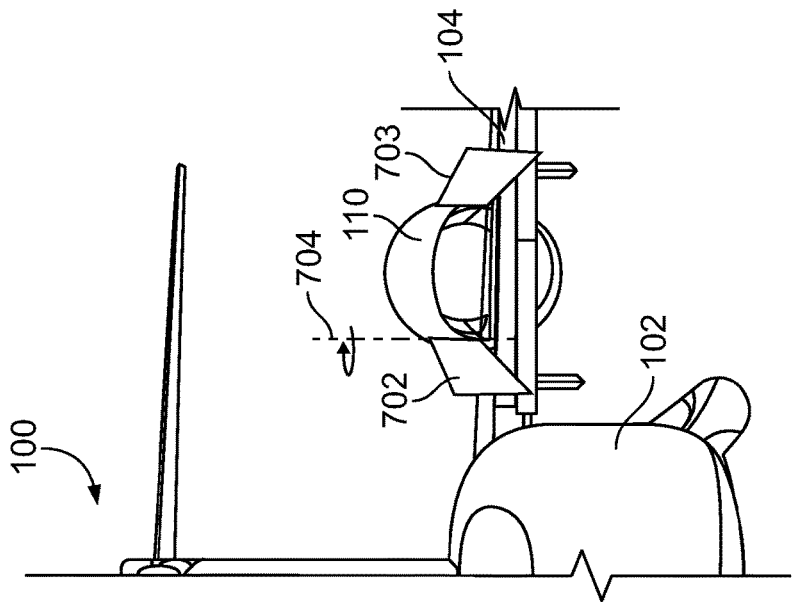
FIG. 7 illustrates an example splayed nozzle to vary an attachment of flow to the fuselage of the example aircraft of FIG. 1.

FIG. 7 illustrates use of an example splayed doors 702, 703 to vary attachment of efflux flow from the second engine 110 to the fuselage 102 of the example aircraft 100 of FIG. 1. In this example, the door 702 may be rotated and/or oriented about an axis 704 to vary a degree to which the efflux from the second engine 110 attaches to the fuselage 102 to control one or more of a yaw, pitch or roll of the aircraft 100. While the doors 702, 703 of the illustrated example are shown in different orientations, in some examples, the doors 702, 703 may be relatively parallel to one another or independently controlled relative to one another. The direction/angular displacement of the door 702 and/or the door 703 relative to the second engine 110 may be controlled via a flight control system such as the automated flight control system 1100 of FIG. 11, for example. In some examples, multiple splay doors may be used to affect/control an attachment of efflux from the second engine 110 and/or different effluxes from multiple fluid sources and/or engines of the aircraft 100 to control one or more of a yaw, pitch or roll of the aircraft 100. In some examples, splay doors associated with different engines may be independently controlled to cause pressure differentials at different locations of the fuselage 102.

Figure 8:
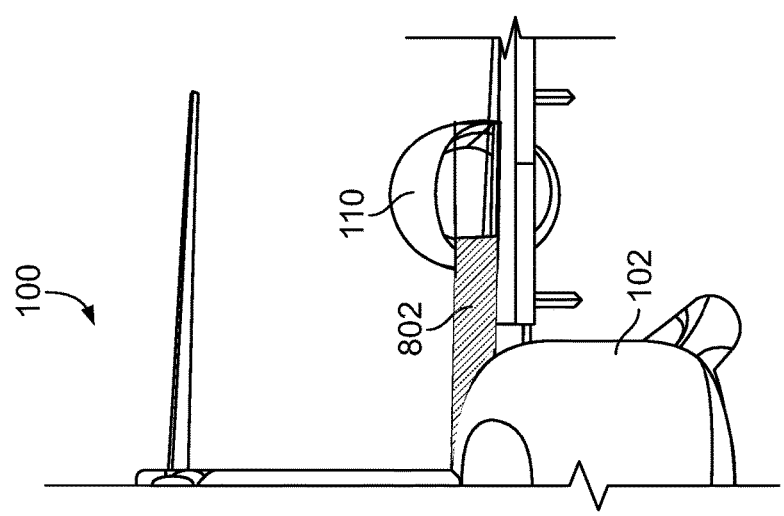
FIG. 8 illustrates an example controlled channel to vary an attachment of flow to the fuselage of the example aircraft of FIG. 1.

FIG. 8 illustrates use of an example controlled channel (e.g., a nacelle) 802 to vary attachment of efflux flow from the second engine 110 to the fuselage 102 of the example aircraft 100 of FIG. 1. In this example, the channel 802 is opened/closed and/or partially opened to vary a degree of an attachment of the efflux to the fuselage 102, thereby controlling one or more of yaw, pitch or roll of the aircraft 100. Use of one or more channels to control attachment of the efflux may allow existing flow spreading gradients to be defined (e.g., spread out) to the fuselage 102 independent of freestream (e.g., flow significantly distanced from an aerodynamic body) influence. In some examples, an automated flight control system such as the automated flight control system of FIG. 11 is used to control the channel 802 (e.g., a degree to which the channel 802 is opened or closed).

Figure 9:
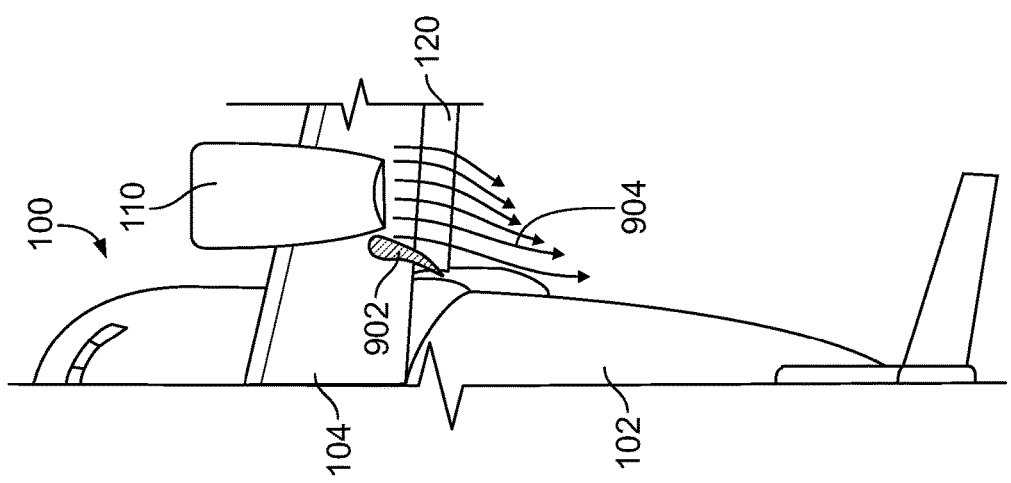
FIG. 9 illustrates an example flap diverter to vary an attachment of flow to the fuselage of the example aircraft of FIG. 1.

FIG. 9 illustrates use of an example vane (e.g., a flap diverter) 902 to vary an attachment of efflux flow 904 from the second engine 110 to the fuselage 102. In this example, the vane 902 coupled (e.g., mounted) to the wing assembly 104. The vane 902 of the illustrated example varies a degree to which the efflux 904 from the second engine 110 attaches to the fuselage 102 to vary one or more of yaw, pitch or roll of the aircraft 100 by rotating about a pivot axis, for example. Additionally or alternatively, in some examples, multiple vanes (e.g., an array of vanes) are placed onto the wing assembly 104 and/or the flap 120. In some examples, multiple vanes are controlled independently of one another to control efflux flow attachment to a fuselage. In some examples, an automated flight control system such as the automated flight control system of FIG. 11 is used to control an orientation of the vane 902. Alternatively, the flap 120, geometry/features of the flap 120, and/or a flow device located on the flap 120 may be used to direct the efflux 904 to attach to the fuselage 102. For example, the flap 120 may be able to orient (e.g., tilt, rotate, etc.) towards the fuselage 102 and/or have features (e.g., flow channels) that direct the efflux 904 to attach to the fuselage 102 in a similar manner to a vane, for example.

Figure 10:
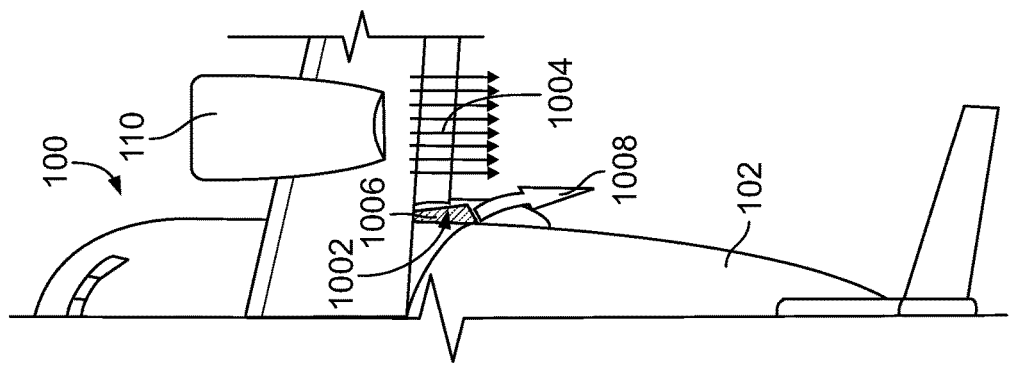
FIG. 10 illustrates an example active flow control system to vary an attachment of flow to the fuselage of the example aircraft of FIG. 1.

FIG. 10 illustrates use of an example active flow control system 1002 to vary an attachment of efflux flow 1004 to the fuselage 102 of the example aircraft 100 of FIG. 1. In this example, the active flow control system 1002, which may be used to locally energize flow around the fuselage 102 and/or promote attachment via a local Coanda effect, is used to vary a degree to which the efflux 1004 from the second engine 110 attaches to the fuselage 102 to control one or more of a yaw, pitch or roll of the aircraft 100. In this example, the active flow control system 1002, which may be disposed within or on the fuselage 102, has at least one nozzle 1006 to provide an active flow control jet, as generally indicated by an arrow 1008. In some examples, an automated flight control system such as the automated flight control 1100 controls the active flow control system 1002 (e.g., controls multiple nozzles of the active flow control system 1002) and/or interfaces/communicates with the active flow control system 1002 to affect flow attachment of the efflux 1004 to the fuselage 102. The example devices of FIGS. 5-10 are only examples and are not limiting in terms of types of flow/aerodynamic mechanisms and/or methodology to vary attachment of effluxes to a fuselage by directing and/or providing efflux flow(s), for example.

Figure 11:
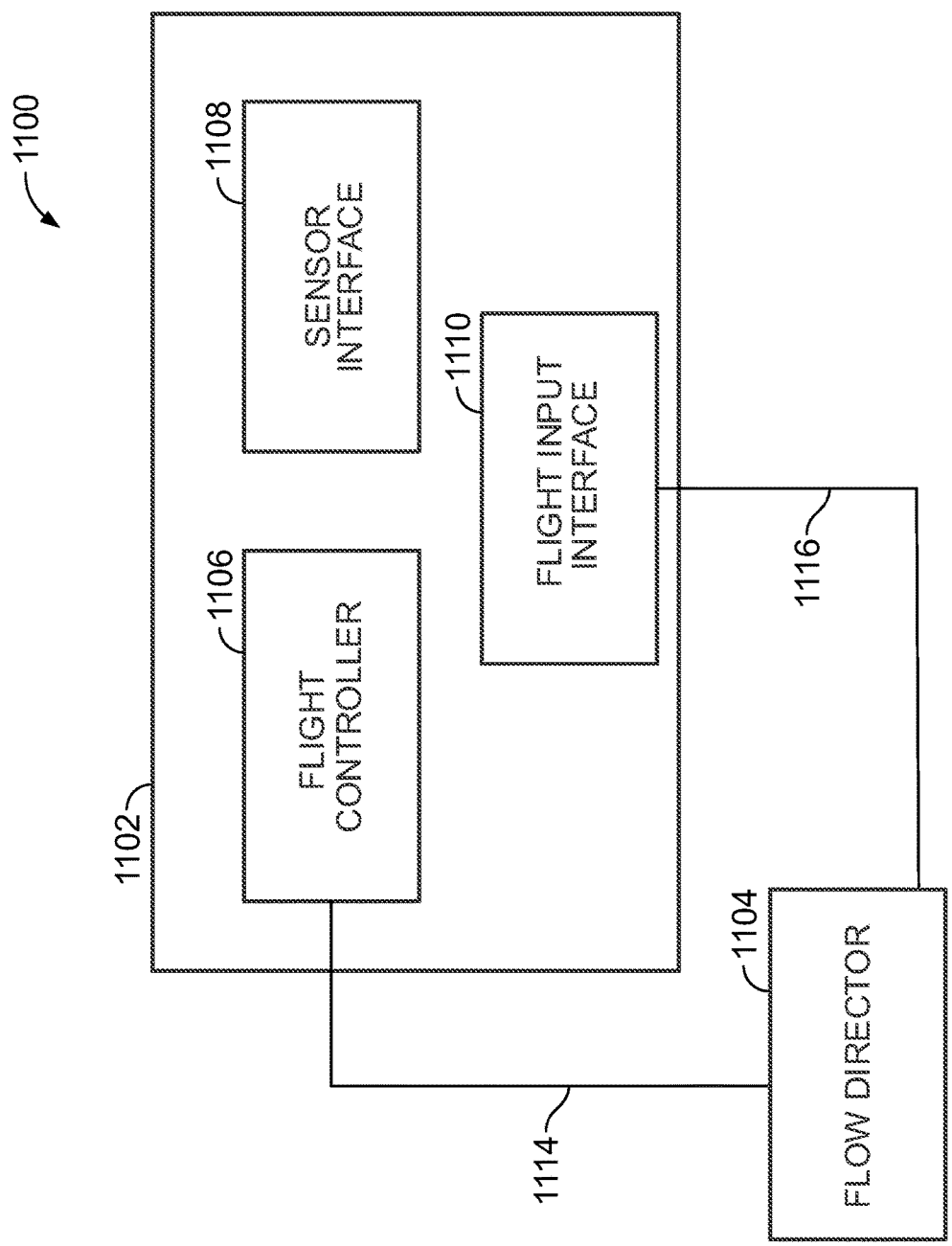
FIG. 11 is an example automated flight control system that may be used to control an example flow director that varies an attachment of flow to the fuselage of the example aircraft of FIG. 1.

FIG. 11 is an example automated flight control system 1100, which includes an example USB engine efflux controller 1102, which may be used to control an example flow director system 1104. The example flow director system 1104 may be used to vary an attachment of efflux flow to the fuselage 102 of the example aircraft 100 of FIG. 1. The engine efflux controller 1102 of the illustrated example includes a flight controller 1106, a sensor (e.g., a flight sensor) interface 1108 and an input (e.g., a flight input) interface 1110. In this example, the flight controller 1106 and/or the engine efflux controller 1102 is communicatively coupled to the flow director 1104 via a communication line 1114. Similarly, the flight input interface 1110 of the illustrated example is communicatively coupled to the flow director 1104 via a communication line 1116.

In operation, the flight input interface 1110 may receive commands and/or control signals from a cockpit control interface, for example, via cockpit communication signals of an aircraft (e.g., the aircraft 100). The control signals may include directional changes, effector (e.g., flap, diverter, channel, etc.) controls and/or control signals processed and/or received from the cockpit control interface (e.g., cockpit controls, input from a yoke, a joystick, a knob, or any other appropriate interface device, etc.). In this example, the flight controller 1106 receives the example control signals and determines and/or issues commands (e.g., control commands related to maneuvering) for the engine efflux controller 1102 to direct the flow director 1104 to cause the engine efflux to attach to the fuselage 102 in a directed manner. In particular, the example flight controller 1106 may direct an actuator that orients a flow device such as the control channel 802 described above in connection with FIG. 8 or the vane 902 of FIG. 9, for example, to control a degree to which the efflux flow is directed towards and/or attaches to the fuselage 102 of the aircraft 100. In particular, the example flight controller 1106 may control a degree to which different efflux flows (e.g., from different sides and/or portions of the fuselage) attach to the fuselage 102 to control the aircraft 100, for example.

In some examples, the flight input interface 1110 directly issues commands to the flow director 1104 via the communication line 1116. In particular, control commands (e.g., flight maneuver commands issued) may be issued from cockpit controls, received at the flight input interface 1110, and relayed to the flow director 1104 to control one or more of a yaw, a pitch or a roll of the aircraft 100. Additionally or alternatively, in some examples, the sensor interface 1108 provides sensor data, which may include flight condition data (e.g., speed, direction, pressure, altitude, etc.), to the flight controller 1106. The sensor data may be used by the flight controller 1106 in conjunction with input commands from the flight input interface 1110 to determine/execute commands (e.g., commands related to deflection of an efflux flow director and/or an effector) to be sent to and/or to control the flow director 1104 to alter an attachment of efflux to a fuselage of an aircraft to maneuver the aircraft.

The flight control system 1100, the engine efflux controller 1102 and/or the flight controller 1106 may be a digital or analog implementation of an automatic flight control system or manual intervention (e.g., manually controlled) by an operator, for example.

While an example manner of implementing the example automated flight control system 1100 of FIG. 1 is illustrated in FIG. 11, one or more of the elements, processes and/or devices illustrated in FIG. 11 may be combined, divided, re-arranged, omitted, eliminated and/or implemented in any other way. Further, the example engine efflux controller 1102, the example flow director 1104, the example flight controller 1106, the example sensor interface 1108, the example input interface 1110 and/or, more generally, the example automated flight control system 1100 of FIG. 11 may be implemented by hardware, software, firmware and/or any combination of hardware, software and/or firmware. Thus, for example, any of the example engine efflux controller 1102, the example flow director 1104, the example flight controller 1106, the example sensor interface 1108, the example input interface 1110 and/or, more generally, the example automated flight control system 1100 of FIG. 11 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)) or direct mechanical or electrical connection. When reading any of the apparatus or system claims of this patent to cover a purely software and/or firmware implementation, at least one of the example, the example engine efflux controller 1102, the example flow director 1104, the example flight controller 1106, the example sensor interface 1108, and/or the example input interface 1110 is/are hereby expressly defined to include a tangible computer readable storage device or storage disk such as a memory, a digital versatile disk (DVD), a compact disk (CD), a Blu-ray disk, etc. storing the software and/or firmware. Further still, the example automated flight control system 1100 of FIG. 11 may include one or more elements, processes and/or devices in addition to, or instead of, those illustrated in FIG. 11, and/or may include more than one of any or all of the illustrated elements, processes and devices.

Figure 12:
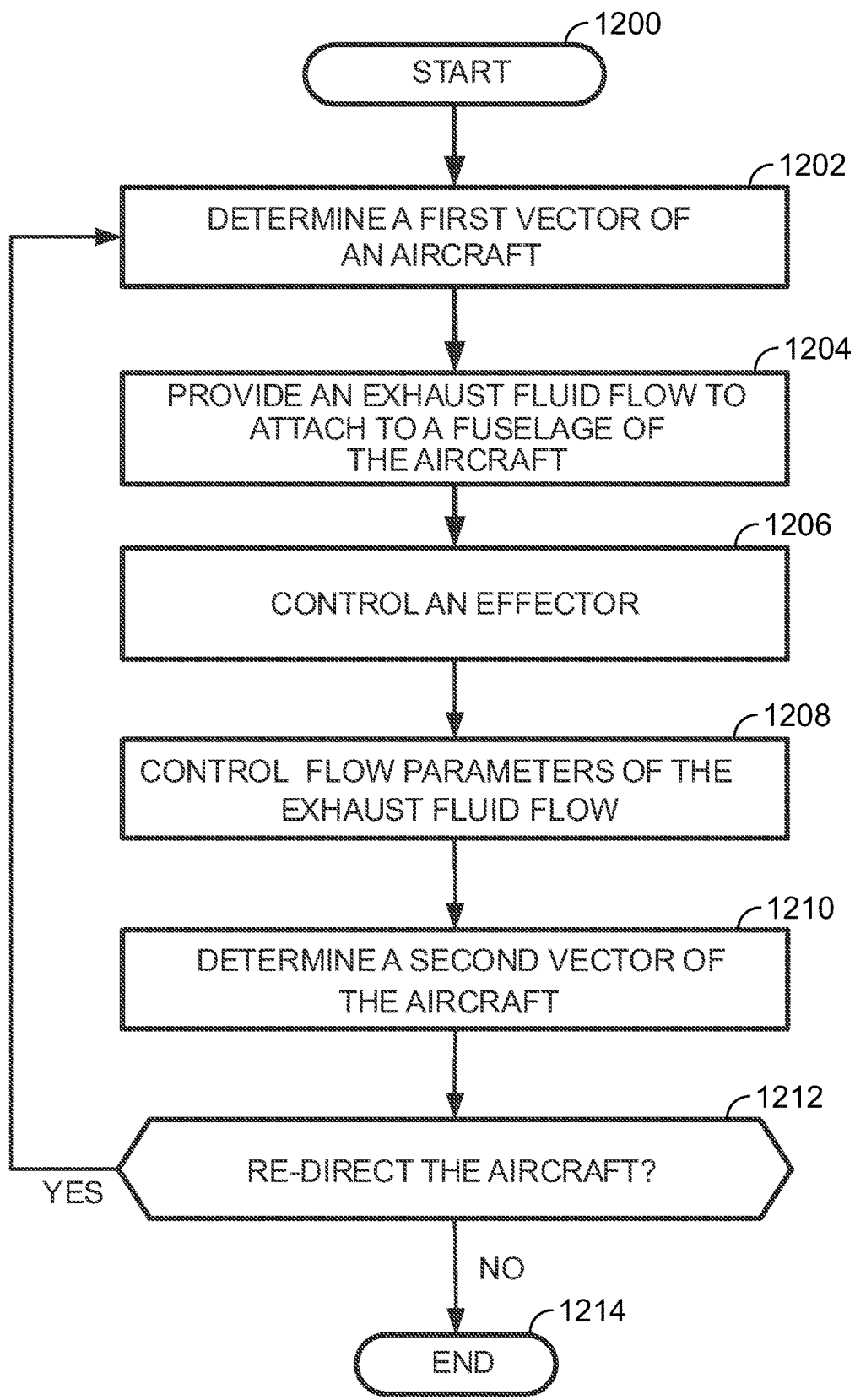
FIG. 12 is a flowchart representative of an example method that may be used to implement the example automated flight control system of FIG. 11.

A flowchart representative an example method for implementing the example automated flight control system 1100 of FIG. 11 is shown in FIG. 12. In this example, the method may be implemented using machine readable instructions that comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example automated flight control system 1100 may alternatively be used. For example, the order of execution of the blocks may be changed, and/or some of the blocks described may be changed, eliminated, or combined and additional blocks within a reasonable scope of the examples disclosed herein may be added.

As mentioned above, the example method of FIG. 12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Additionally or alternatively, in some examples, the processes of FIG. 12 may be implemented with analog components or mechanical implementations that do not utilize tangible media and/or coded instructions. As used herein, when the phrase "at least" is used as the transition term in a preamble of a claim, it is open-ended in the same manner as the term "comprising" is open ended.

The example method of FIG. 12 begins at block 1200 where an aircraft (e.g., the aircraft 100) is in flight and control of the aircraft (e.g., maneuvering, STOL or ESTOL maneuvering) is to be executed by an automated flight control system (e.g., the automated flight control system 1100), which controls a degree to which efflux flow from an engine of an upper surface blowing system (e.g., the second engine 110) attaches to a fuselage (e.g., the fuselage 102) of the aircraft.

In this example, a first vector (e.g., speed and direction, vector speed in multiple directions) of the aircraft is determined by a sensor interface such as the sensor interface 1108 described above in connection with FIG. 11 (block 1202). Based on the first vector and/or a calculated directional correction, the flight control system then triggers and/or causes an effector such as the vane 902 of FIG. 9, for example, to provide/direct an exhaust fluid flow/efflux from an upper surface blowing system to attach to the fuselage of the aircraft (block 1204). In this example, the effector is continuously controlled to vary and/or change a degree to which the flow/efflux attaches to the fuselage (block 1206). In this example, the effector is disposed on the fuselage. However, in other examples, the effector may be disposed on a wing and/or wing assembly, for example. In yet other examples, effectors are disposed on or between both a fuselage and/or a wing assembly. In some examples, multiple effectors and/or multiple flow/efflux sources are used to vary attachment of multiple effluxes on different positions of the fuselage to cause resultant pressure differentials (e.g., pressure deltas) to affect a flight characteristic of the aircraft (e.g., one or more of a yaw, a pitch or a roll of the aircraft).

In some examples, control of flow parameters of the efflux such as a flow rate and/or flow dimensions (e.g., flow confinement, flow width, flow path, etc.) is controlled to influence an attachment of the efflux to the fuselage (block 1208). In some examples, a flow rate of the efflux is controlled via engine power. Additionally or alternatively, flow characteristics are controlled such as flow confinement (e.g., flow width confinement and/or flow direction). Next, a second vector of the aircraft is determined by the sensor interface 1108, for example (block 1210). Based on the second vector, it is them determined whether the aircraft is to be re-directed (e.g., whether the aircraft course of travel is to be adjusted and/or a course correction of the aircraft is to be issued) (block 1212).

If it is determined that the aircraft is to be re-directed (block 1212), the process returns control to block 1202. This determination may be based on a difference between the first and second vectors, for example. If it is determined that the aircraft is not to be re-directed (block 1212), the process ends (block 1214). In some examples, the process is restarted when it is determined that a flight control command/input has been received and/or the sensor interface 1108 indicates that the aircraft will need to be re-directed.

Figure 13:
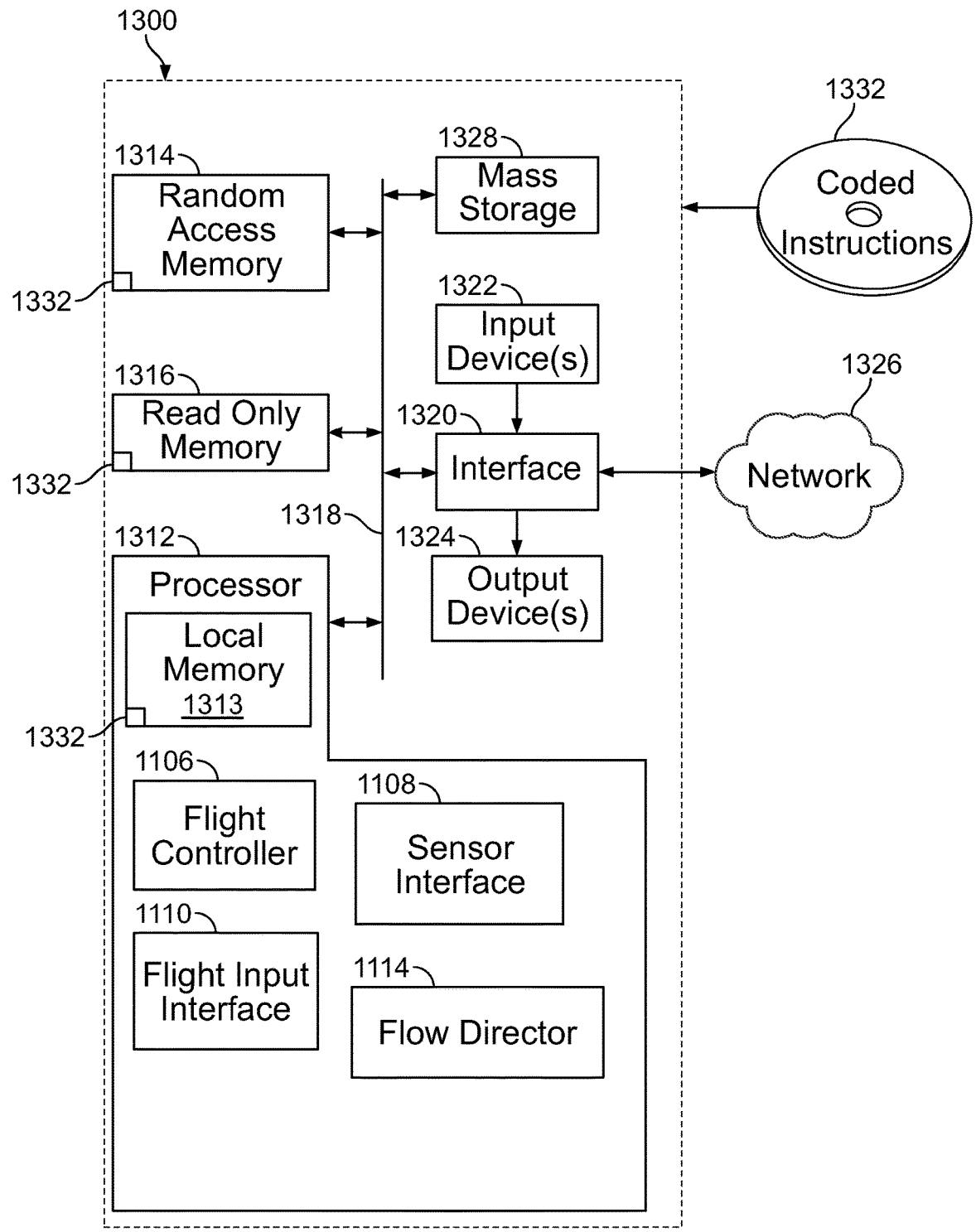
FIG. 13 is a block diagram of an example processor platform capable of executing machine readable instructions to implement the example method of FIG. 12.

FIG. 13 is a block diagram of an example processor platform 1300 capable of executing instructions to implement the method of FIG. 12 and the automated flight control system 1100 of FIG. 11. The processor platform 1300 can be, for example, a server, a personal computer, a mobile device (e.g., a cell phone, a smart phone, a tablet computer), a personal digital assistant (PDA), an Internet appliance, a digital video recorder, a personal video recorder, a set top box, a flight control computer or other avionics hardware, or any other type of computing device.

The processor platform 1300 of the illustrated example includes a processor 1312. In this example, the processor platform 1300 includes the example automated flight control system 1302, the example flow controller 1304, the example flight controller 1306, the example sensor interface 1308 and the example input interface 1310. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), MIL-1553 databus, avionics communication bus and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

Coded instructions 1332 to implement the methods of FIG. 12 may be stored in the mass storage device 1328, in the volatile memory 1314, in the non-volatile memory 1316, and/or on a removable tangible computer readable storage medium such as a CD or DVD.

From the foregoing, it will be appreciated that the above disclosed methods and apparatus allow increased degrees of control of an aircraft with an upper surface blowing system. The examples disclosed herein improve the degree to which the aircraft can be maneuvered during STOL or ESTOL maneuvers, for example. The examples disclosed herein allow reduction in control surface sizes, which may result in improved efficiency due to weight and drag reduction as well as improved life of the aircraft.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples are described in relation to USB aircraft systems, the examples disclosed herein may be applied to other types of aircraft (i.e., non-STOL/ESTOL aircraft), propulsion systems, maneuvers, vehicles, aerodynamic structures, etc.

What is claimed is:

1. An apparatus comprising:
    a flow director of an aircraft, the flow director to cause an exhaust stream of an upper surface blowing system to attach to a fuselage of the aircraft, wherein the flow director includes an active flow control system disposed on the fuselage; and
    a controller to control the flow director to affect one or more of a pitch, a yaw or a roll of the aircraft by varying a degree of the attachment of the exhaust stream to the fuselage.

2. The apparatus as defined in claim 1, wherein a source of the exhaust stream includes an engine of the aircraft.

3. The apparatus as defined in claim 2, wherein the flow director includes a vane mounted proximate the engine.

4. The apparatus as defined in claim 1, wherein the flow director includes a deployable effector disposed on the fuselage.

5. The apparatus as defined in claim 4, wherein a degree to which the deployable effector moves relative to the fuselage is controlled by the controller.

6. The apparatus as defined in claim 1, wherein the flow director includes an effector disposed on the fuselage.

7. The apparatus as defined in claim 6, wherein the effector is re-positionable along the fuselage.

8. An apparatus comprising:
    a flow director of an aircraft, the flow director to cause an exhaust stream of an upper surface blowing system to attach to a fuselage of the aircraft, wherein the fuselage includes a protrusion, and wherein the flow director directs the exhaust stream to the protrusion to control the aircraft; and
    a controller to control the flow director to affect one or more of a pitch, a yaw or a roll of the aircraft by varying a degree of the attachment of the exhaust stream to the fuselage.

9. A method comprising:
    controlling, via a flow director, an attachment of an exhaust fluid flow from an upper surface blowing system to a fuselage of an aircraft to change at least one flight characteristic of the aircraft, wherein the flow director includes an active flow control system disposed on the fuselage.

10. The method as defined in claim 9, further including controlling an effector disposed on the fuselage to vary a degree of attachment of the exhaust fluid flow to the fuselage.

11. The method as defined in claim 9, wherein the exhaust flow is directed towards an effector disposed on the fuselage.

12. The method as defined in claim 9, wherein directing the exhaust fluid flow to attach to the fuselage includes deploying an effector disposed on the fuselage.

13. A tangible machine readable medium comprising instructions stored thereon, which when executed, cause a controller to at least:
    receive a flight input for an aircraft; and
    control a flow director to direct an amount of flow from an upper surface blowing system engine of the aircraft to attach to a fuselage of the aircraft to control one or more of a yaw, a pitch, or a roll of the aircraft, wherein the flow director includes an active flow control system disposed on the fuselage.

14. The tangible machine readable medium having instructions stored thereon as defined in claim 13, wherein the instructions cause the controller to control a relationship between multiple effluxes of the upper surface blowing system to control one or more of the yaw, the pitch, or the roll of the aircraft.

15. The tangible machine readable medium as defined in claim 13, wherein the flight input is based on one or more of flight condition data or cockpit controls of the aircraft.

16. The tangible machine readable medium as defined in claim 13, wherein the flight input is based on one or more of flight condition data or cockpit controls of the aircraft.

* * * * *